United States Patent
Ping et al.

(10) Patent No.: US 11,894,785 B2
(45) Date of Patent: Feb. 6, 2024

(54) INTEGRATED FLEXIBLE SELF-CHARGING POWER SUPPLY FOR ENERGY HARVESTING IN AGRICULTURAL ENVIRONMENT AND PREPARATION METHOD THEREOF

(71) Applicant: ZHEJIANG UNIVERSITY, Hangzhou (CN)

(72) Inventors: Jianfeng Ping, Hangzhou (CN); Xunjia Li, Hangzhou (CN); Yibin Ying, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 294 days.

(21) Appl. No.: 17/624,263

(22) PCT Filed: Aug. 13, 2020

(86) PCT No.: PCT/CN2020/108877
§ 371 (c)(1),
(2) Date: Dec. 31, 2021

(87) PCT Pub. No.: WO2021/052072
PCT Pub. Date: Mar. 25, 2021

(65) Prior Publication Data
US 2022/0360197 A1   Nov. 10, 2022

(30) Foreign Application Priority Data

Sep. 18, 2019   (CN) .................. 201910881674.X (51) Int. Cl.
*H02N 1/04*   (2006.01)
*H01G 11/32*   (2013.01)
(Continued)

(52) U.S. Cl.
CPC ............... *H02N 1/04* (2013.01); *H01G 11/32* (2013.01); *H01G 11/56* (2013.01); *H01G 11/86* (2013.01)

(58) Field of Classification Search
CPC ........ H01G 11/08; H01G 11/26; H01G 11/32; H01G 11/34; H01G 11/56; H01G 11/84;
(Continued)

(56) References Cited

U.S. PATENT DOCUMENTS

| 6,367,332 B1 * | 4/2002 | Fisher .................... G08B 13/10 156/56 |
| 2009/0135036 A1 * | 5/2009 | Werking ................. G05F 1/561 341/143 |

(Continued)

FOREIGN PATENT DOCUMENTS

| CN | 104811085 A | 7/2015 |
| CN | 106230089 A | 12/2016 |

(Continued)

*Primary Examiner* — Naishadh N Desai
(74) *Attorney, Agent, or Firm* — Bayramoglu Law Offices LLC (57) ABSTRACT

An integrated flexible self-charging power supply for energy harvesting in an agricultural environment and a preparation method thereof are provided, wherein the integrated flexible self-charging power supply for the energy harvesting in the agricultural environment includes polydimethylsiloxane (PDMS) and a graphene electrode entirely encapsulated in the PDMS, where the graphene electrode includes a power generation portion and an interdigital portion; the power generation portion and the interdigital portion are integrally encapsulated in the PDMS; the interdigital portion is covered with a solid electrolyte; two ends of the interdigital portion of the graphene electrode are led out by wires to serve as two output ends of the power supply.

18 Claims, 5 Drawing Sheets

(51) Int. Cl.
*H01G 11/56* (2013.01)
*H01G 11/86* (2013.01)

(58) Field of Classification Search
CPC ........ H01G 11/86; Y02E 60/13; H02J 7/0042; H02J 7/32; H02J 7/345; H02N 1/04; H02N 1/06
See application file for complete search history.

(56) References Cited

U.S. PATENT DOCUMENTS

| | | | |
|---|---|---|---|
| 2012/0134072 A1 | 5/2012 | Bae et al. | |
| 2016/0033389 A1* | 2/2016 | Serpe | G01N 5/025 73/29.01 |

FOREIGN PATENT DOCUMENTS

| | | | |
|---|---|---|---|
| CN | 106655438 A | 5/2017 | |
| CN | 106932128 A | 7/2017 | |
| CN | 107546829 A | 1/2018 | |
| CN | 107961438 A | 4/2018 | |
| CN | 108539837 A | 9/2018 | |
| CN | 110739879 A | 1/2020 | |

* cited by examiner

INTEGRATED FLEXIBLE SELF-CHARGING POWER SUPPLY FOR ENERGY HARVESTING IN AGRICULTURAL ENVIRONMENT AND PREPARATION METHOD THEREOF

CROSS REFERENCE TO THE RELATED APPLICATIONS

This application is the national phase entry of International Application No. PCT/CN2020/108877, filed on Aug. 13, 2020, which is based upon and claims priority to Chinese Patent Application No. 201910881674.X, filed on Sep. 18, 2019, the entire contents of which are incorporated herein by reference.

TECHNICAL FIELD

The present disclosure relates to the technical field of new energy, and in particular to, an integrated flexible self-charging power supply for energy harvesting in an agricultural environment and a preparation method thereof.

BACKGROUND

The increasingly intelligent and modular development of modern agriculture is fueling the demand for various sensors, while posing higher requirements on power supply modules such as long-term sustainable energy supply, stable output and outstanding environmental adaptability. At present, the triboelectric nanogenerator (TENG) based on the coupling of the triboelectric effect and the electrostatic induction effect is considered as a potential substitute for traditional rigid power supplies. Through the selection of advanced materials and the design of smart structures, various types of TENGs have been developed and applied in various fields, such as human behavior sensing, ocean energy harvesting and wind energy harvesting. However, the irregular pulse alternating current (AC) signal and low-current output of the TENG are not suitable for directly driving micro-devices and charging ordinary energy storage units. In addition, the micro-batteries and other small energy storage units generally have low energy density and limited cycle life, which cannot meet the requirements for large-scale, long-term continuous energy supply of micro-sensor networks in agriculture. Compared with the micro-batteries, supercapacitors have higher power density, longer cycle life, wider operating temperature limit and are more environmentally friendly. Therefore, they are more suitable to combine with the TENG to build an integrated energy supply system.

At present, there have been many attempts to combine the TENG with supercapacitors, but the derived devices still have some shortcomings such as low integration, low flexibility and large size. Recently, the laser-induced graphene has been proposed as a new type of active material for the electrodes of the flexible supercapacitor and the TENG. The laser-induced graphene is obtained by directly applying laser on the surface of a polymer to photothermally convert the $sp^3$-carbon atoms of the polymer into $sp^2$-carbon atoms. The laser-induced graphene is easier to prepare than two-dimensional (2D) materials and conductive polymers.

SUMMARY

In order to solve the problems existing in the background art, the present disclosure provides an integrated flexible self-charging power supply for energy harvesting in an agricultural environment and a preparation method thereof. The present disclosure solves the technical problem of the energy supply of a huge number of sensors in the construction of the Internet of Things (IoT) in agriculture.

Figure 1:
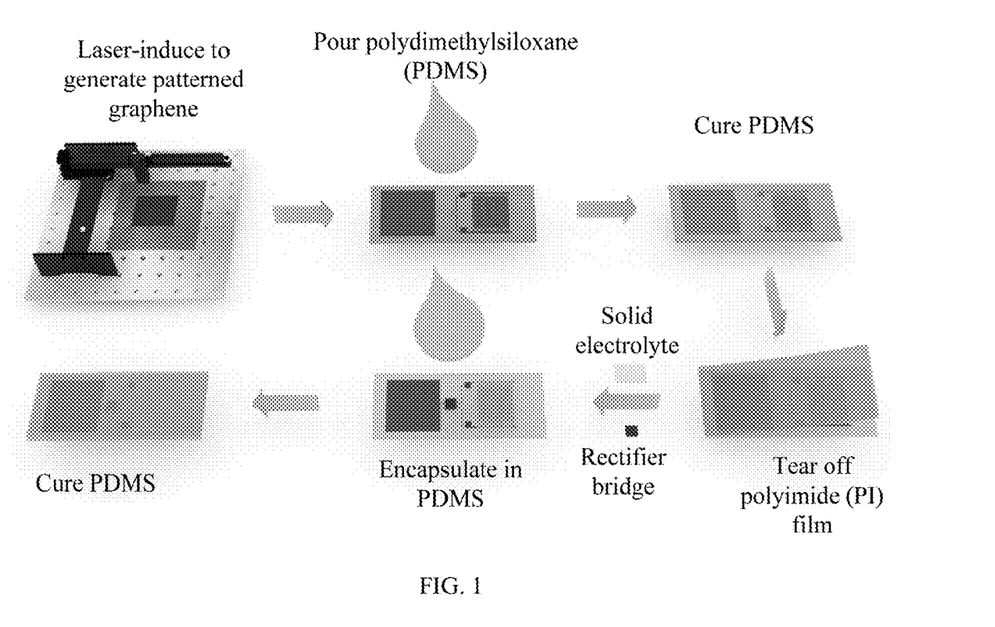
FIG. 1 illustrates a preparation process of a complete device according to Example 1 of the present disclosure.

As shown in FIG. 1, the present disclosure provides the following technical solutions:

1. Integrated flexible self-charging power supply for energy harvesting in agricultural environment The integrated flexible self-charging power supply for energy harvesting in an agricultural environment includes polydimethylsiloxane (PDMS) and a graphene electrode entirely encapsulated in the PDMS, where the graphene electrode includes a power generation portion and an interdigital portion; the power generation portion and the interdigital portion are integrally encapsulated in the PDMS; the interdigital portion is covered with a solid electrolyte; two ends of the interdigital portion of the graphene electrode are led out by wires to serve as two output ends of the power supply.

The present disclosure may use laser-induced graphene to construct a triboelectric nanogenerator (TENG) and a solid-state supercapacitor in a single-electrode mode, and encapsulate them with the PDMS.

The graphene electrode may be generated by laser induction treatment on a surface of polyimide (PI) by a laser system composed of a blue diode laser (450 nm, power 1-5 W, with the best effect under the power of 4 W) and an XY biaxial stepping motor.

The graphene electrode may have a fixed pattern, which may be drawn by computer-aided design (CAD) software, which is controlled by a computer with commercial path control software.

The power generation portion and the interdigital portion of each of the TENG and the solid supercapacitor are respectively generated by laser induction on the surface of the PI film in one step.

Figure 6:
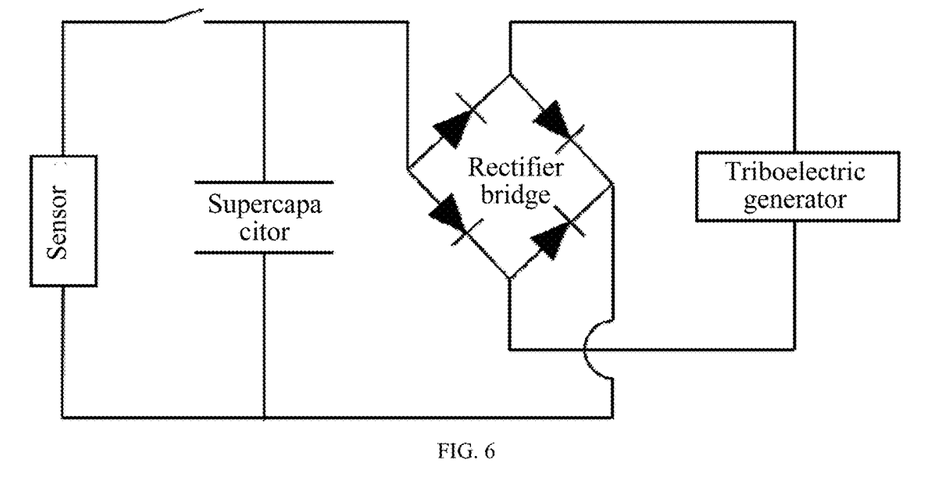
FIG. 6 illustrates a circuit diagram of a connection relationship between a power generation portion and an interdigital portion.
Figure 7:
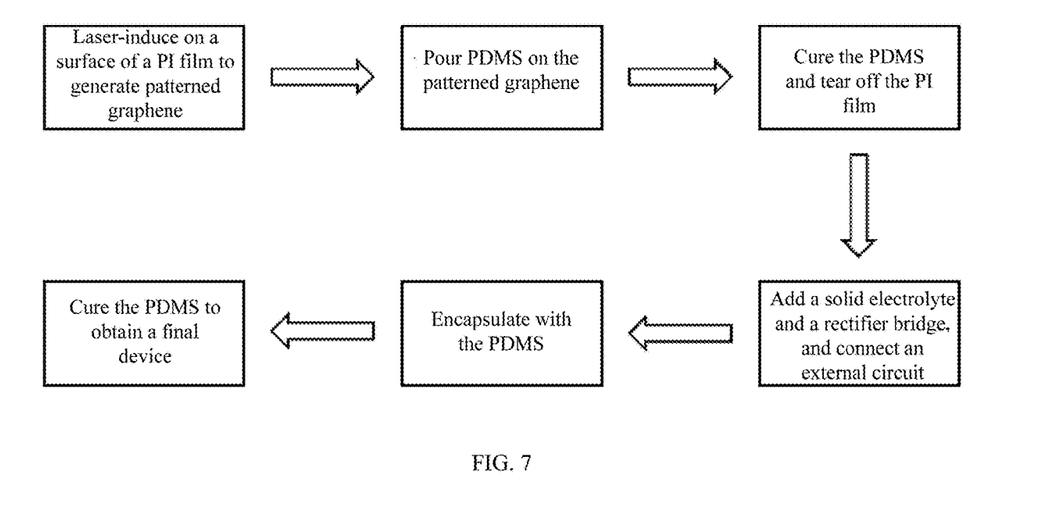
FIG. 7 is a logical block diagram of a preparation method of the present disclosure.

2. Preparation method of integrated flexible self-charging power supply. As shown in FIG. 7, the preparation method includes:

(1) generating a patterned graphene electrode by laser induction on a surface of a PI film, where the graphene electrode includes a power generation portion and an interdigital portion;

the graphene electrode is generated by carbonizing the surface of the PI film by laser induction treatment to form a single continuous porous carbon atom layer;

(2) pouring a PDMS mixed solution on the surface of the PI film on a side where the graphene electrode is located, where the solution at least covers the graphene electrode, and in a specific implementation, the PDMS mixed solution completely covers the surface of the PI film; then removing air bubbles in a gap between the PDMS and the surface of the PI film by vacuum treatment, and curing the PDMS by heating, such that the graphene electrode is fixed to the PDMS after curing;

(3) removing the PI film from a surface of the cured PDMS to separate the graphene electrode from the surface of the PI film, so as to obtain a flexible laser-induced graphene electrode;

(4) electrically connecting the power generation portion and the interdigital portion of the laser-induced graphene electrode by a bridge rectifier and a copper wire, as shown in FIG. 6;

(5) covering the interdigital portion with a solid electrolyte to combine the interdigital portion with the solid electrolyte to form a supercapacitor; and (6) leading out two ends of the interdigital portion and connecting wires, pouring the PDMS mixed solution to completely cover a surface of the laser-induced graphene electrode on the side where the graphene electrode is located, removing air bubbles by vacuum treatment, and curing to finally obtain the integrated flexible self-charging power supply.

The power generation portion may be a complete square metal sheet structure, and the interdigital portion may be a typical interdigital electrode structure.

The two ends of the interdigital portion may be led out by the wires to serve as two output ends of the power supply.

In step (1), the patterned graphene electrode is specifically generated by laser induction in the following manner: cutting the surface of the PI film to a required size, and fixing the cut PI film in a prefabricated mold, and carrying out laser induction treatment on the surface of the PI film by using a laser with a vertical distance of 7.5 cm, a scanning speed of 10 mm/s and an output power of 3.85 W, to generate the patterned graphene electrode.

Step (2) specifically includes: preparing the PDMS and a curing agent at a mass ratio of 10:1 into the PDMS mixed solution; placing the final product obtained in step (1) in a vacuum oven for 30 min to remove air to allow the PDMS mixed solution to completely penetrate a porous structure of the graphene electrode; placing a mold in an oven at 80° C. for 2 h to cure the PDMS into a PDMS film.

In step (3), the PI film is removed from the PDMS to obtain the graphene electrode, and the graphene electrode is transferred to the flexible laser-induced graphene electrode on the PDMS film.

In step (5), the solid electrolyte may be prepared from 1 g of polyvinyl alcohol (PVAC), 0.8 g of phosphoric acid and 10 mL of deionized water.

3. Use of integrated flexible self-charging power supply. The integrated flexible self-charging power supply is used for energy harvesting in an agricultural environment.

The integrated flexible self-charging power supply is used as a flexible device to be attached to a surface of a crop, and is configured to harvest swing energy from a crop leave and raindrop energy through the triboelectric effect and the electrostatic induction effect, and convert the harvested energy into electrical energy for storage. Specifically, an alternating current (AC) generated by the power generation portion is converted into a direct current (DC) and stored in the supercapacitor composed of the interdigital portion and the solid electrolyte.

The integrated flexible self-charging power supply of the present disclosure works in a single-electrode mode, and the principle is as follows:

The power generation portion serves as a triboelectric negative layer and is placed on an upper surface of the crop leave. The crop leave and the electrode of the power generation portion are combined to form a triboelectric generator. When the upper power generation portion approaches or leaves the lower crop leave, or when the power generation portion frictionally moves relative to the lower crop leave, the local electric field distribution changes. Thus, an electron exchange occurs between the electrode and the ground so as to balance the potential change on the electrode.

Compared with the prior art, the present disclosure has the following beneficial effects.

The present disclosure features high integration, high flexibility, dual-mode energy harvesting, simple preparation and long-term stable operation, and is a desirable substitute for traditional agricultural energy supply systems.

Compared with the traditional energy supply system, the present disclosure can realize energy harvesting in the agricultural environment, and features self-charging, multi-mode energy storage, integrated type, high flexibility and simple one-step preparation.

DETAILED DESCRIPTION OF THE EMBODIMENTS

The present disclosure is described in further detail below with reference to the drawings and examples.

The examples of the present disclosure are described as follows.

FIG. 1 illustrates a preparation process of a complete device.

(1) A patterned graphene electrode was generated by laser induction on a surface of a polyimide (PI) film, where the graphene electrode included a power generation portion and an interdigital portion. The power generation portion was a complete square metal sheet structure, and the interdigital portion was a typical interdigital electrode structure. Two ends of the interdigital portion were led out by the wires to serve as two output ends of the power supply.

Specifically, the surface of the PI film was cut to a required size, and the cut PI film was fixed in a prefabricated mold. Laser induction treatment was carried out on the surface of the PI film by using a laser with a vertical distance of 7.5 cm, a scanning speed of 10 mm/s and an output power of 1-5 W, to generate the patterned graphene electrode.

(2) Polydimethylsiloxane (PDMS) and a curing agent at a mass ratio of 10:1 were prepared into a PDMS mixed solution. The final product obtained in Step (1) was placed in a vacuum oven for 30 min to remove air to allow the PDMS mixed solution to completely penetrate a porous structure of the graphene electrode. A mold was placed in an oven at 80° C. for 2 h to cure the PDMS into a PDMS film.

(3) The PI film was removed from the PDMS to separate the graphene electrode from the PI film, and the obtained graphene electrode was transferred to the flexible laser-induced graphene electrode on the PDMS film.

(4) The power generation portion and the interdigital portion of the laser-induced graphene electrode were electrically connected by a bridge rectifier, as shown in FIG. 6.

(5) The interdigital portion was covered with a solid electrolyte, such that the interdigital portion was combined with the solid electrolyte to form a supercapacitor. The solid electrolyte was prepared from 1 g of polyvinyl alcohol (PVAC), 0.8 g of phosphoric acid and 10 mL of deionized water.

(6) The two ends of the interdigital portion were led out and connected to wires. The PDMS mixed solution was poured to complete cover a surface of the laser-induced graphene electrode on a side where the graphene electrode was located. Air bubbles were removed by vacuum treatment. Then curing was carried out to finally obtain the integrated flexible self-charging power supply.

Figure 2:
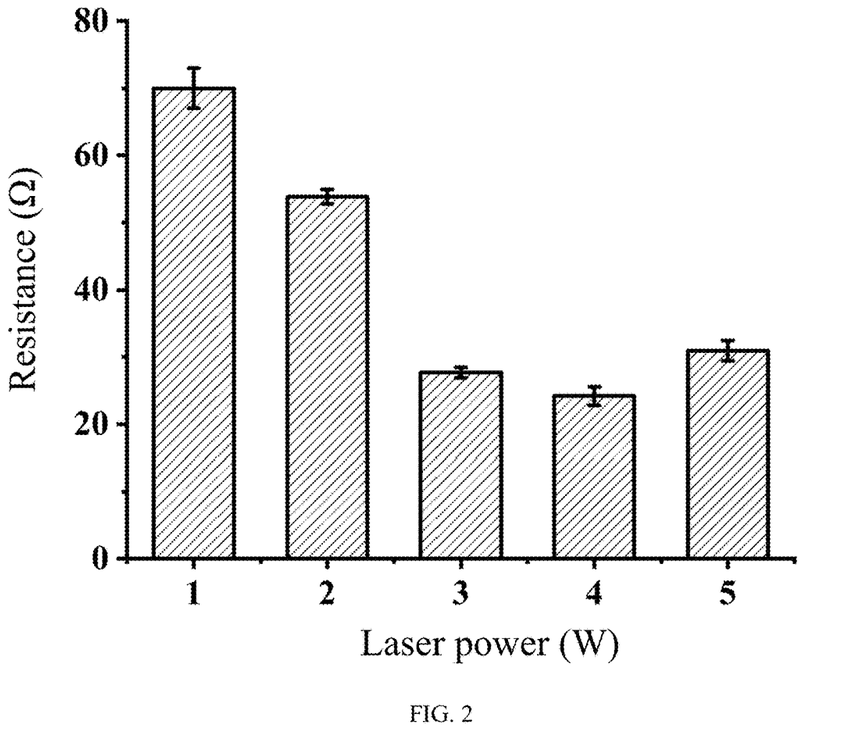
FIG. 2 illustrates a resistance of graphene obtained under different laser powers (1-5 W) according to Example 2 of the present disclosure.
Figure 3:
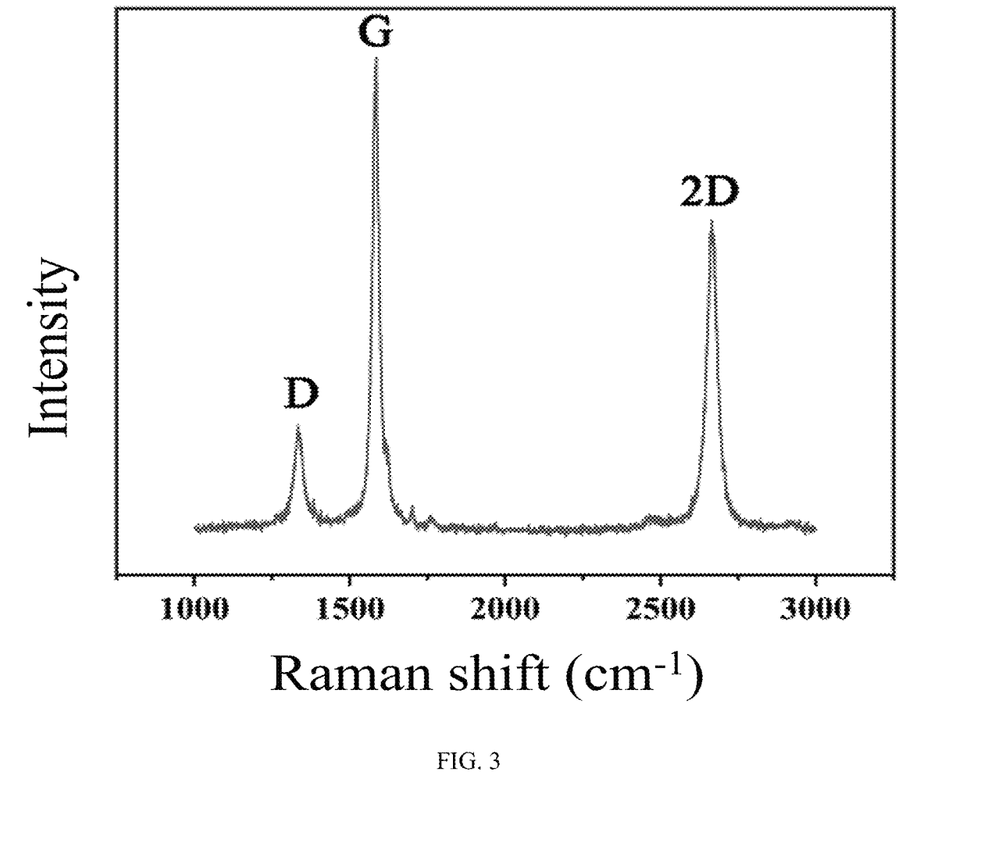
FIG. 3 illustrates a Raman spectrum of graphene obtained under a laser power of 4 W according to Example 2 of the present disclosure.

In the implementation of the experiment, the mass of the laser-induced graphene had been explored many times. The PI film was cut to a required size, and the cut PI film was fixed in a prefabricated mold. The laser had a vertical distance of 7.5 cm from the surface of the PI and a scanning speed of 10 mm/s. By controlling the output power (1-5 W) of the laser, graphene of different masses was obtained. As shown in FIG. 2, the resistance of the obtained graphene was measured with a square resistance meter, and it was found that the resistance under the mass of the graphene was the lowest when the laser power was 4 W. A Raman spectroscopy analysis of the graphene obtained under the laser power of 4 W was carried out, showing that there was an obvious graphene characteristic peak in the spectrum, as shown in FIG. 3.

Figure 4:
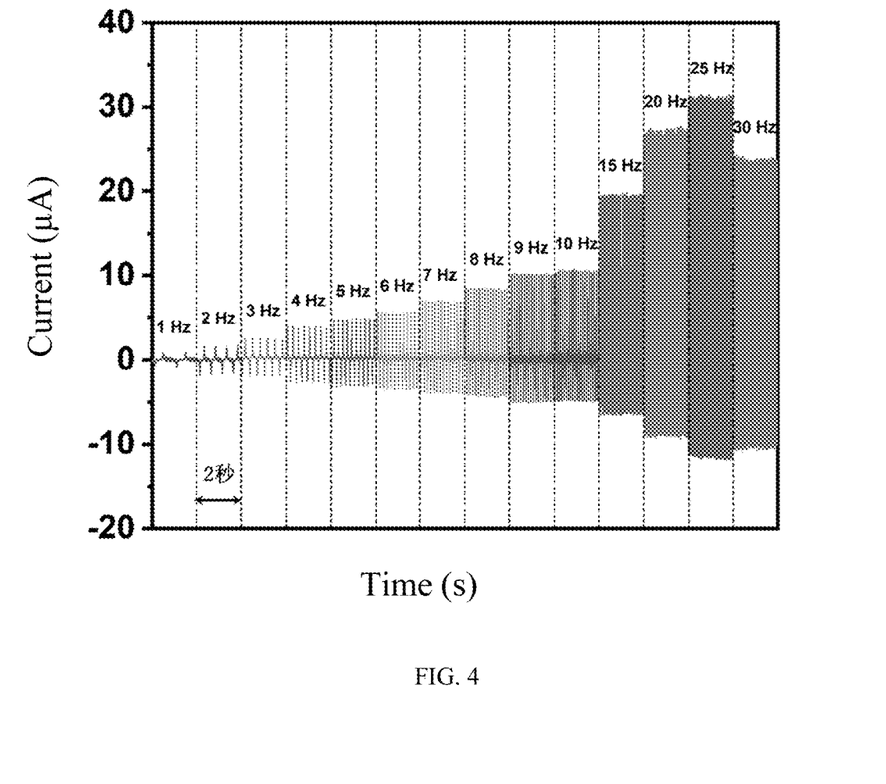
FIG. 4 illustrates an output current of a triboelectric generator using different linear motor frequencies (1-30 Hz) under a fixed linear motor power of 10 W according to Example 3 of the present disclosure.
Figure 5:
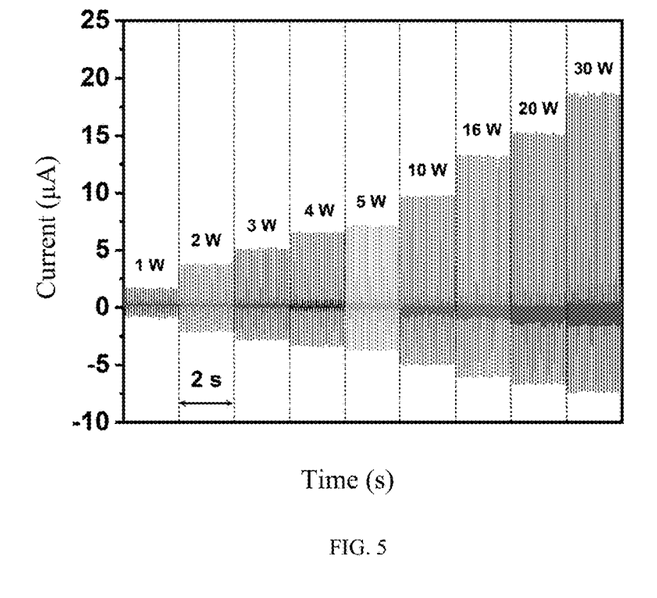
FIG. 5 illustrates an output current of a triboelectric generator using a fixed linear motor frequency (10 Hz) under different linear motor powers of 1-30 W.

During the implementation, multiple experiments were carried out on the output of the triboelectric generator. The triboelectric generator was fixed directly below a linear motor, and a plant leave was fixed on a shaft end of the linear motor to simulate the contact and separation of the leave and the generator. The working power of the fixed linear motor was 10 W, and the generator output different currents by controlling the working frequency (1-30 Hz) of the linear motor. As shown in FIG. 4, as the frequency of the motor increased, the current output by the generator was also increasing, which was maximized at 25 Hz. The working frequency of the fixed linear motor was 10 Hz, and the generator output different currents by controlling the working power (1-30 W) of the linear motor. As shown in FIG. 5, as the frequency of the motor increased, the current output by the generator was also increasing, which was maximized at 30 W.

Test 1: The device was used to harvest swing energy from a leave.

The device was fixed on an upper surface of one plant leave with a waterproof double-sided tape, and the other leave above the device was fixed, for example, by fixing a petiole, to make a lower surface of the leave as close to the device as possible.

An electric fan was used as a wind source. The wind direction and wind speed (5 m/s) of the electric fan were fixed to simulate the blowing of the leave by wind in the natural world. The upper leave and the surface of the device were continuously contacted and separated to generate frictional energy, and the frictional energy was converted into electric energy and stored in the supercapacitor.

Test 2: The device was used to harvest raindrop energy.

The device was fixed on a surface of a plant according to the method of Example 1.

A shower head was fixed above the fixed device to simulate a rain process. Raindrops had a fixed flow rate of 50 mL/s, a height of 30 cm, and were at an angle of 15°. The raindrops and the power generation portion of the device were contacted and separated to generate frictional energy, and the frictional energy was converted into electrical energy and stored in the supercapacitor.

The technical solutions and beneficial effects of the present disclosure are described in detail through the above embodiments. It should be understood that the above described are only specific embodiments of the present disclosure, and are not intended to limit the present disclosure. Any modifications, supplements and equivalent replacements made within the principles and scope of the present disclosure should be included in the protection scope of the present disclosure.

What is claimed is:

1. An integrated flexible self-charging power supply for energy harvesting in an agricultural environment, comprising polydimethylsiloxane (PDMS) and a graphene electrode entirely encapsulated in the PDMS, wherein
   the graphene electrode comprises a power generation portion and an interdigital portion;
   the power generation portion and the interdigital portion are integrally encapsulated in the PDMS;
   the interdigital portion is covered with a solid electrolyte;
   two ends of the interdigital portion of the graphene electrode are led out by wires to serve as two output ends of the integrated flexible self-charging power supply.

2. The integrated flexible self-charging power supply for the energy harvesting in the agricultural environment according to claim 1, wherein the power generation portion and the interdigital portion are respectively generated by laser induction on a surface of a polyimide (PI) film in one step.

3. A preparation method of the integrated flexible self-charging power supply for the energy harvesting in the agricultural environment according to claim 1, comprising the following steps:
   (1) generating a patterned graphene electrode by laser induction on a surface of a polyimide (PI) film, wherein the patterned graphene electrode comprises a first power generation portion and a second interdigital portion;
   (2) pouring a PDMS mixed solution on the surface of the PI film on a side where the patterned graphene electrode is located, wherein the solution at least covers the patterned graphene electrode; then removing air bubbles by vacuum treatment, and curing PDMS by heating to obtain cured PDMS;
   (3) removing the PI film from a surface of the cured PDMS to separate the patterned graphene electrode from the surface of the PI film, so as to obtain a flexible laser-induced graphene electrode;
   (4) electrically connecting a second power generation portion and a second interdigital portion of the flexible laser-induced graphene electrode by a bridge rectifier and a copper wire;
   (5) covering the second interdigital portion with the solid electrolyte to combine the second interdigital portion with the solid electrolyte to form a supercapacitor; and
   (6) leading out two ends of the second interdigital portion and connecting the wires, pouring the PDMS mixed solution on a surface of the flexible laser-induced graphene electrode on a side where the graphene electrode is located, removing the air bubbles by the vacuum treatment, and curing to finally obtain the integrated flexible self-charging power supply.

4. The preparation method of the integrated flexible self-charging power supply for the energy harvesting in the agricultural environment according to claim 3, wherein the power generation portion is a complete square metal sheet structure, and the interdigital portion is a typical interdigital electrode structure.

5. The preparation method of the integrated flexible self-charging power supply for the energy harvesting in the agricultural environment according to claim 3, wherein in step (1), the patterned graphene electrode is generated by the laser induction in the following manner: cutting the surface of the PI film to obtain a cut PI film of a required size, fixing the cut PI film in a prefabricated mold, and carrying out laser induction treatment on a surface of the cut PI film by using a laser with a vertical distance of 7.5 cm, a scanning speed of 10 mm/s and an output power of 3.85 W, to generate the patterned graphene electrode.

6. The preparation method of the integrated flexible self-charging power supply for the energy harvesting in the agricultural environment according to claim 3, wherein step (2) comprises: mixing the PDMS and a curing agent at a mass ratio of 10:1 to prepare the PDMS mixed solution; placing a final product obtained in step (1) in a vacuum oven for 30 min to remove air to allow the PDMS mixed solution to completely penetrate a porous structure of the patterned graphene electrode; placing a mold in an oven at 80° C. for 2 h to cure the PDMS into a PDMS film.

7. The preparation method of the integrated flexible self-charging power supply for the energy harvesting in the agricultural environment according to claim 3, wherein in step (3), the PI film is removed from the cured PDMS to obtain the flexible laser-induced graphene electrode, wherein the graphene electrode is transferred on a PDMS film formed by the cured PDMS.

8. The preparation method of the integrated flexible self-charging power supply for the energy harvesting in the agricultural environment according to claim 4, wherein in step (5), the solid electrolyte is prepared from 1 g of polyvinyl alcohol (PVA), 0.8 g of phosphoric acid and 10 mL of deionized water.

9. A method of using the integrated flexible self-charging power supply according to claim 1, wherein the integrated flexible self-charging power supply is used for the energy harvesting in the agricultural environment.

10. The method according to claim 9, wherein
the integrated flexible self-charging power supply is used as a flexible device to be attached to a surface of a crop, and is configured to harvest swing energy from a crop leave and raindrop energy through a triboelectric effect and an electrostatic induction effect, and convert the swing energy and the raindrop energy into electrical energy for storage.

11. The preparation method of the integrated flexible self-charging power supply for the energy harvesting in the agricultural environment according to claim 3, wherein the power generation portion and the interdigital portion are respectively generated by the laser induction on a surface of a polyimide (PI) film in one step.

12. The method according to claim 9, wherein the power generation portion and the interdigital portion are respectively generated by laser induction on a surface of a polyimide (PI) film in one step.

13. The method according to claim 9, wherein a preparation method of the integrated flexible self-charging power supply comprises the following steps;
  (1) generating a patterned graphene electrode by laser induction on a surface of a polyimide (PI) film, wherein the patterned graphene electrode comprises a first power generation portion and a second interdigital portion;
  (2) pouring a PDMS mixed solution on the surface of the PI film on a side where the patterned graphene electrode is located, wherein the solution at least covers the patterned graphene electrode; then removing air bubbles by vacuum treatment, and curing PDMS by heating to obtain cured PDMS;
  (3) removing the PI film from a surface of the cured PDMS to separate the patterned graphene electrode from the surface of the PI film, so as to obtain a flexible laser-induced graphene electrode;
  (4) electrically connecting a second power generation portion and a second interdigital portion of the flexible laser-induced graphene electrode by a bridge rectifier and a copper wire;
  (5) covering the second interdigital portion with the solid electrolyte to combine the second interdigital portion with the solid electrolyte to form a supercapacitor; and
  (6) leading out two ends of the second interdigital portion and connecting the wires, pouring the PDMS mixed solution on a surface of the flexible laser-induced graphene electrode on a-side where the graphene electrode is located, removing the air bubbles by the vacuum treatment, and curing to finally obtain the integrated flexible self-charging power supply.

14. The method according to claim 13, wherein the power generation portion is a complete square metal sheet structure, and the interdigital portion is a typical interdigital electrode structure.

15. The method according to claim 13, wherein in step (1), the patterned graphene electrode is generated by the laser induction in the following manner: cutting the surface of the PI film to obtain a cut PI film of a required size, fixing the cut PI film in a prefabricated mold, and carrying out laser induction treatment on a surface of the cut PI film by using a laser with a vertical distance of 7.5 cm, a scanning speed of 10 mm/s and an output power of 3.85 W, to generate the patterned graphene electrode.

16. The method according to claim 13, wherein step (2) comprises: mixing the PDMS and a curing agent at a mass ratio of 10:1 to prepare the PDMS mixed solution; placing a final product obtained in step (1) in a vacuum oven for 30 min to remove air to allow the PDMS mixed solution to completely penetrate a porous structure of the patterned graphene electrode; placing a mold in an oven at 80° C. for 2 h to cure the PDMS into a PDMS film.

17. The method according to claim 13, wherein in step (3), the PI film is removed from the cured PDMS to obtain the flexible laser-induced graphene electrode, wherein the graphene electrode is transferred on a PDMS film formed by the cured PDMS.

18. The method according to claim 14, wherein in step (5), the solid electrolyte is prepared from 1 g of polyvinyl alcohol (PVAC), 0.8 g of phosphoric acid and 10 mL of distilled water.

\* \* \* \* \*